(12) United States Patent
Shi et al.

(10) Patent No.: US 12,603,493 B2
(45) Date of Patent: Apr. 14, 2026

(54) REVERSE WIRING SELF-PROTECTION CIRCUIT AND SOLID-STATE CIRCUIT BREAKER INCLUDING THE SAME

(71) Applicant: Schneider Electric (China) Co., Ltd., Beijing (CN)

(72) Inventors: Ying Shi, Shanghai (CN); Benjamin Edwards, Morrisville, NC (US); Yang Hu, Shanghai (CN); Haijun Zhao, Shanghai (CN); Zhigang Han, Shanghai (CN); Bonuo Zheng, Shanghai (CN)

(73) Assignee: Schneider Electric (China) Co., Ltd., Beijing (CN)

( * ) Notice: Subject to any disclaimer, the term of this patent is extended or adjusted under 35 U.S.C. 154(b) by 170 days.

(21) Appl. No.: 18/435,290

(22) Filed: Feb. 7, 2024

(65) Prior Publication Data

US 2025/0233408 A1     Jul. 17, 2025

(30) Foreign Application Priority Data

Jan. 12, 2024    (CN) .......................... 202410051988.8

(51) Int. Cl.
*H02H 7/00*          (2006.01)
*H02H 7/22*          (2006.01)
(52) U.S. Cl.
CPC .................................. *H02H 7/222* (2013.01)
(58) Field of Classification Search
None
See application file for complete search history.

(56) References Cited

U.S. PATENT DOCUMENTS

| | | | |
|---|---|---|---|
| 2004/0145846 A1* | 7/2004 | Fasano ................. | H01H 71/123 361/115 |
| 2009/0174413 A1* | 7/2009 | Bucella .................. | G01R 31/67 324/511 |
| 2010/0091418 A1* | 4/2010 | Xu .......................... | H02H 3/021 361/42 |
| 2012/0287496 A1* | 11/2012 | Nagel ................... | H02M 7/217 359/267 |
| 2023/0104392 A1 | 4/2023 | Zhang et al. | |
| 2023/0396057 A1 | 12/2023 | Zhang et al. | |

* cited by examiner

*Primary Examiner* — Stephen W Jackson
(74) *Attorney, Agent, or Firm* — Quinn IP Law

(57)          ABSTRACT

A reverse wiring self-protection circuit is disclosed, including an auxiliary power module configured to provide tripping electric energy for tripping the solid-state circuit breaker to a tripping coil of the solid-state circuit breaker before an isolating switch of the solid-state circuit breaker is closed; a reverse wiring determination module configured to determine whether DC power connected to the solid-state circuit breaker is reversely wired, and output a first driving enable signal enabling a driving circuit module in response to reverse wiring of the DC power; the driving circuit module is configured to, transmit a driving signal indicating tripping operation to the tripping coil, in response to the first driving enable signal. The reverse wiring self-protection circuit according to the present disclosure can protect the elements included in the solid-state circuit breaker itself and improve the personal safety of the DC system to which the solid-state circuit breaker is connected.

20 Claims, 13 Drawing Sheets isolating switch 301

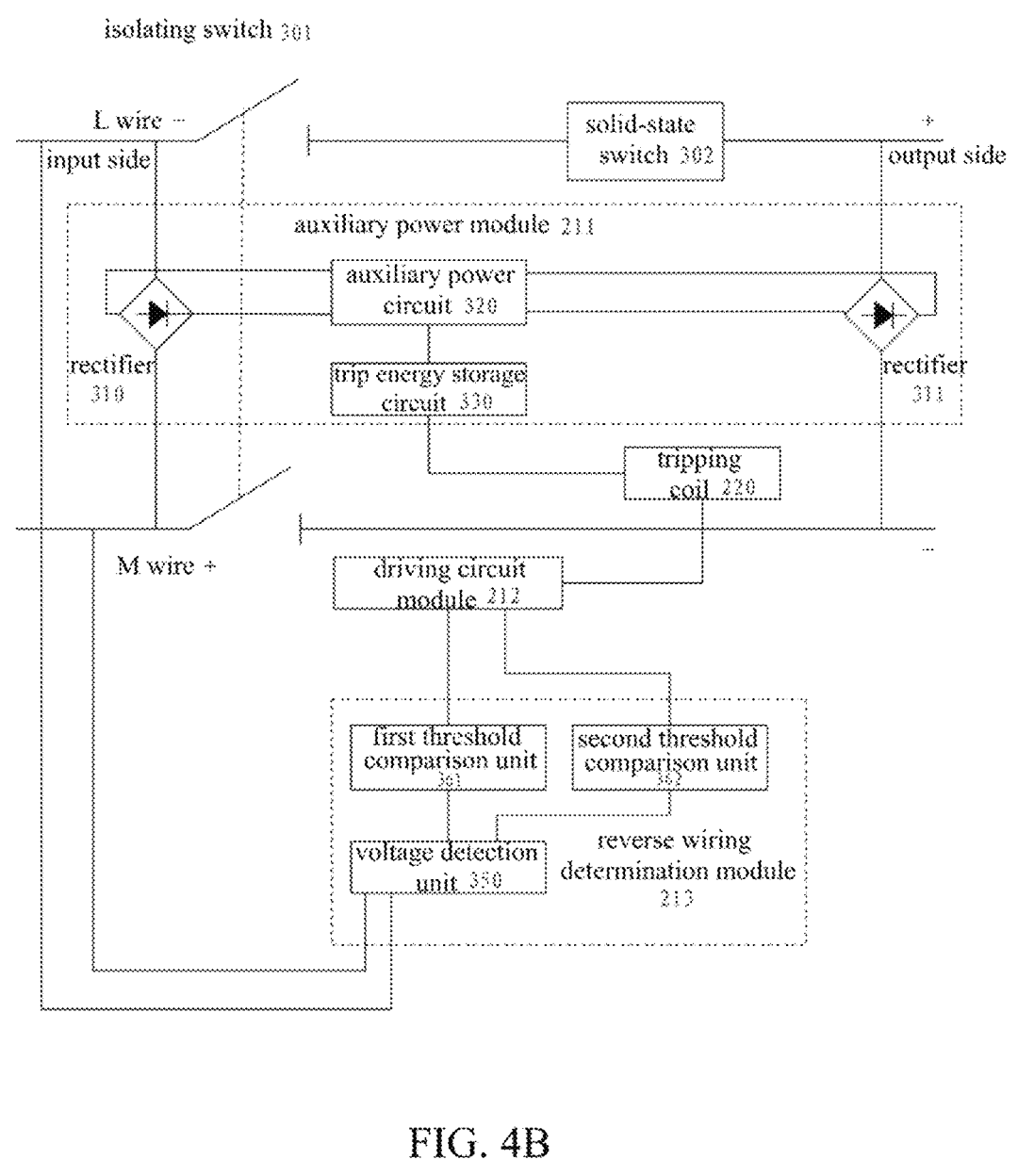

L wire − input side solid-state
switch 302

+ output side auxiliary power module 211 auxiliary power
circuit 320 rectifier
310 trip energy storage
circuit 330 rectifier
311 tripping
coil 220

M wire + driving circuit
module 212 first threshold
comparison unit
361 second threshold
comparison unit
362 voltage detection
unit 350 reverse wiring
determination module
213

FIG. 4B

REVERSE WIRING SELF-PROTECTION CIRCUIT AND SOLID-STATE CIRCUIT BREAKER INCLUDING THE SAME

CROSS-REFERENCE TO RELATED APPLICATION

This application is based on and claims priority to Chinese Patent Application No. 202410051988.8, filed on Jan. 12, 2024 in the Chinese Patent Office, the contents of which being herein incorporated by reference in its entirety.

TECHNICAL FIELD

The disclosure relates to a reverse wiring self-protection circuit and a solid-state circuit breaker including the reverse wiring self-protection circuit.

BACKGROUND

Solid-state circuit breaker is the future development trend of terminal distribution equipment. In DC distribution system, especially in DC microgrid with a large number of distributed power sources, solid-state circuit breakers have a good application prospect. However, compared with the traditional AC distribution system, there are some potential wrong using ways in DC microgrid. These wrong using ways have not been fully analyzed and effectively protected. For example, the reverse voltage on the input side or/and the output side caused by the wrong wiring of the main circuit in the wrong using ways may potentially cause damage to the solid-state circuit breaker itself. Therefore, a technical solution is expected to realize the reverse wiring self-protection of solid-state circuit breaker.

SUMMARY

An embodiment of the present disclosure provides a reverse wiring self-protection circuit for a solid-state circuit breaker for DC power, comprising: an auxiliary power module configured to provide tripping electric energy for tripping the solid-state circuit breaker to a tripping coil of the solid-state circuit breaker before an isolating switch of the solid-state circuit breaker is closed; a reverse wiring determination module configured to determine whether DC power connected to the solid-state circuit breaker is reversely wired, and output a first driving enable signal enabling a driving circuit module in response to reverse wiring of the DC power; the driving circuit module is configured to, transmit a driving signal indicating tripping operation to the tripping coil, in response to the first driving enable signal.

The reverse wiring self-protection circuit according to the embodiment of the present disclosure, wherein the auxiliary power module comprises: a rectifier configured to rectify the DC power and provide the rectified voltage to an auxiliary power circuit; an auxiliary power circuit configured to generate tripping electric energy based on the rectified voltage and provide the tripping electric energy to a trip energy storage circuit, the trip energy storage circuit is configured to store the tripping electric energy provided by the auxiliary power circuit to provide energy for completing the tripping operation.

The reverse wiring self-protection circuit according to the embodiment of the present disclosure, wherein the DC power connected to the solid-state circuit breaker includes a first DC power connected to the input side of the solid-state circuit breaker and a second DC power connected to the output side of the solid-state circuit breaker, wherein, the rectifier is configured to rectify the first DC power and the second DC power and provide them to the auxiliary power circuit.

The reverse wiring self-protection circuit according to the embodiment of the present disclosure, wherein the auxiliary power circuit is an isolated auxiliary power circuit.

The reverse wiring self-protection circuit according to the embodiment of the present disclosure, wherein the auxiliary power circuit is a non-isolated auxiliary power circuit.

The reverse wiring self-protection circuit according to the embodiment of the present disclosure, wherein the auxiliary power circuit is further configured to provide an operating voltage to the control circuit of the solid-state switch of the solid-state circuit breaker.

The reverse wiring self-protection circuit according to the embodiment of the present disclosure, wherein the reverse wiring determination module comprises: a voltage detection unit configured to detect a voltage of the DC power; a threshold comparison unit configured to compare the voltage detected by the voltage detection unit with a threshold to determine whether the DC power is reversely wired.

The reverse wiring self-protection circuit according to the embodiment of the present disclosure, wherein the threshold comparison unit comprises: a first threshold comparison unit configured to determine whether the DC power is reversely wired; a second threshold comparison unit configured to determine whether overvoltage occurs in the DC power; and wherein, the reverse wiring determination module is further configured to output a first driving enable signal enabling the driving circuit module in response to determining that the DC power is reversely wired or overvoltage occurs.

The reverse wiring self-protection circuit according to the embodiment of the present disclosure, wherein the DC power connected to the solid-state circuit breaker comprises a first DC power connected to the input side of the solid-state circuit breaker and a second DC power connected to the output side of the solid-state circuit breaker, wherein the reverse wiring determination module is configured to determine whether at least one of the first DC power and the second DC power is reversely wired.

The reverse wiring self-protection circuit according to the embodiment of the present disclosure, further comprising: a micro-motion detection circuit configured to: detect a micro-motion signal of a handle of the solid-state circuit breaker; output a second driving enable signal in response to detecting the micro-motion signal of the handle of the solid-state circuit breaker; and AND logic circuit configured to: performing AND operation on the first driving enable signal and the second driving enable signal to obtain a third driving enable signal, transmitting the third driving enable signal to the driving circuit module; wherein, the driving circuit module transmits a driving signal indicating tripping operation to the tripping coil in response to the third driving enable signal.

The reverse wiring self-protection circuit according to the embodiment of the present disclosure, wherein when the handle is between a threshold position and a mechanically closed position of a handle stroke of the solid-state circuit breaker, the micro-motion detection circuit detects the micro-motion signal, and wherein the threshold position is located between a mechanically tripped position and a mechanically reset position of the handle of the solid-state circuit breaker.

The reverse wiring self-protection circuit according to the embodiment of the present disclosure, wherein the micro-motion detection circuit detects the micro-motion signal when the handle is at the mechanically closed position of the handle stroke.

The reverse wiring self-protection circuit according to the embodiment of the present disclosure, wherein the driving signal indicates the tripping coil to trip the solid-state circuit breaker to the mechanically tripped position of the handle stroke.

An embodiment of the present disclosure provides a solid-state circuit breaker for DC power, comprising: an isolating switch connected between the solid-state circuit breaker and the DC power and configured to isolate or close the connection between the solid-state circuit breaker and the DC power; a solid-state switch connected in series on the live wire of the solid-state circuit breaker; a tripping coil configured to trip the solid-state circuit breaker using trip electric energy provided by an auxiliary power module in response to receiving a driving signal; a reverse wiring self-protection circuit comprises: the auxiliary power module configured to provide tripping electric energy for tripping the solid-state circuit breaker to a tripping coil of the solid-state circuit breaker before the isolating switch of the solid-state circuit breaker is closed; a reverse wiring determination module configured to determine whether DC power connected to the solid-state circuit breaker is reversely wired, and output a first driving enable signal enabling a driving circuit module in response to reverse wiring of the DC power; the driving circuit module configured to, transmit a driving signal indicating tripping operation to the tripping coil, in response to the first driving enable signal.

The reverse wiring self-protection circuit according to the embodiment of the present disclosure and the solid-state circuit breaker including the reverse wiring self-protection circuit can detect whether the reverse wiring occurs at the input or output side of the solid-state circuit breaker before the isolating switch is closed. When reverse wiring is detected, the solid-state circuit breaker can be tripped in time. Thus, the elements included in the solid-state circuit breaker may be protected itself and the personal safety of the DC system to which the solid-state circuit breaker is connected is improved.

BRIEF DESCRIPTION OF DRAWINGS

The above and other aspects, features and advantages of specific embodiments of the present disclosure will become more apparent from the following description taken in conjunction with the accompanying drawings, in which:

FIGS. 4A-4C are another reverse wiring self-protection circuit diagram according to an embodiment of the present disclosure;

DETAILED DESCRIPTION

Figure 1A:
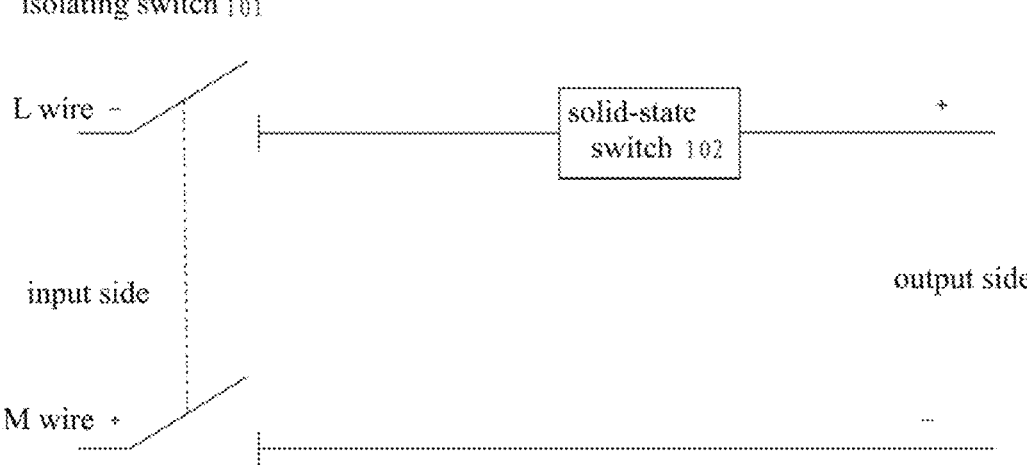
FIG. 1A is a schematic diagram of a reverse wiring according to a solid-state circuit breaker.

Before proceeding to the following detailed description, it may be beneficial to set forth the definitions of certain words and phrases used throughout this patent document. The terms "include" and "contain" and their derivatives refer to including but not limited to. The phrase "at least one", when used with a list of items, means that different combinations of one or more of the listed items can be used, and only one item in the list may be needed. For example, "at least one of A, B, C" includes any one of the following combinations: A, B, C, A and B, A and C, B and C, A and b and C.

Definitions of other specific words and phrases are provided throughout this disclosure. It should be understood by those skilled in the art that in many cases, if not most cases, such definitions also apply to the previous and future uses of words and phrases so defined.

The following description of various embodiments of the principles of the present disclosure in this patent application document taken in conjunction with the accompanying drawings is for illustration only and should not be interpreted as limiting the scope of the present disclosure in any way. Those skilled in the art will understand that the principles of the present disclosure can be implemented in any suitably arranged system or device. In some cases, the actions described in the specification can be performed in a different order and still achieve the desired results. Moreover, the processes depicted in the drawings do not necessarily require the specific order or sequential order shown to achieve the desired results. In certain embodiments, multitasking and parallel processing may be advantageous.

The text and drawings are provided as examples only to help understand the present disclosure. They should not be construed as limiting the scope of the claims appended to this disclosure in any way. Throughout the drawings, like reference numerals generally indicate like elements. Although certain embodiments and examples have been provided, based on the disclosure, it is clear to those skilled in the art that changes can be made to the illustrated embodiments and examples without departing from the scope of the disclosure.

FIG. 1A is a schematic diagram of a reverse wiring according to a solid-state circuit breaker.

As shown in FIG. 1A, the solid-state circuit breaker includes an isolating switch 101 and a solid-state switch 102. The L wire represents the live wire and the M wire represents the mid-point line. In case of normal wiring, the L wire is connected to positive polarity voltage (L+), and the M wire is connected to protective grounding or negative polarity voltage (M−). In case of wrong operation (such as reverse wiring), the L wire is wrongly connected to protective grounding or negative polarity voltage (L−), and the M wire is connected to positive polarity voltage (M+).

The isolating switch 101 is connected between the solid-state circuit breaker and the DC power, and is configured to isolate or close the connection between the solid-state circuit breaker and the DC power. The solid-state switch 102 is connected in series with the live wire of the solid-state circuit breaker.

In the DC microgrid system, the identification of isolated island operation mode is not reliable. At present, the DC microgrid controller recognizes the status of the devices in the DC microgrid and controls the devices through communication. Both the input side and the output side of the solid-state circuit breaker in FIG. 1A are connected to a DC power supply (for example, a prosumer), and there may be reverse wiring in one of the input side and the output side (for example, the input side). In this case, closing the isolating switch 101 can cause the solid-state switch 102 in the solid-state circuit breaker to withstand twice the rated power supply voltage. Twice the rated power supply voltage applied to the solid-state switch 102 may cause the solid-state switch 102 to break down and be damaged. Furthermore, the solid-state circuit breaker is damaged.

Figure 1B:
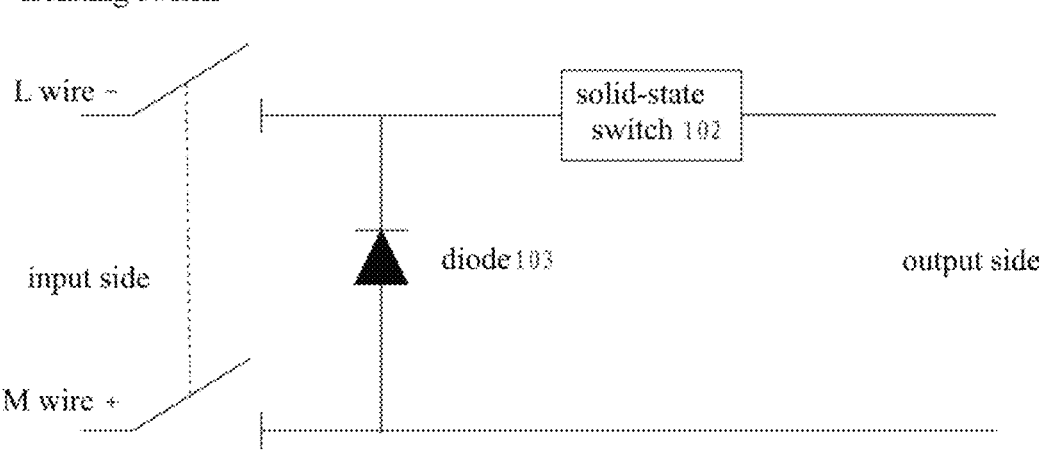
FIG. 1B is a schematic diagram of another reverse wiring according to a solid-state circuit breaker.

FIG. 1B is another reverse wiring diagram according to the solid-state circuit breaker.

Description of elements in FIG. 1B that are the same as those in FIG. 1A are not repeated. The solid-state circuit breaker includes a diode 103 connected between the L wire and the M wire.

In FIG. 1B, the input side of the solid-state circuit breaker is connected to a DC power supply, the output side is connected to a load, and there may be reverse wiring on the input side. In this case, closing the isolating switch 102 may cause the diode 103 to turn on in the forward direction, thus causing a short circuit due to breakdown. Short-circuit current can damage elements in solid-state circuit breakers.

Figure 1C:
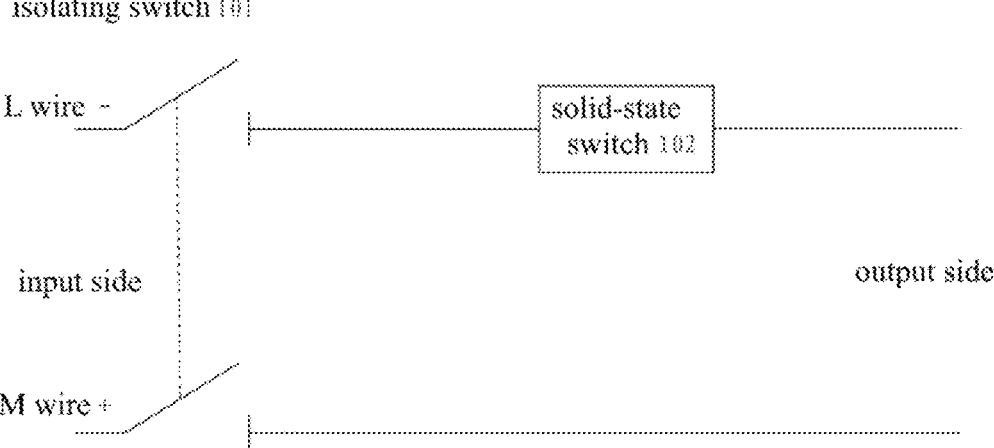
FIG. 1C is a schematic diagram of another reverse wiring according to a solid-state circuit breaker.

FIG. 1C is another reverse wiring situation according to the solid-state circuit breaker. Description of elements in FIG. 1C that are the same as those in FIG. 1A are not repeated.

In FIG. 1C, the input side of the solid-state circuit breaker is connected to a DC power supply, and the output side is connected to a load, and there is reverse wiring in both the input side and the output side. In this case, after the isolating switch 101 is closed, the solid-state circuit breaker enters a standby state. In this case, the solid-state switch 102 essentially cuts off the midpoint line of TN (terra neutral) system where the solid-state circuit breaker is located, due to the reverse wiring on both the input side and the output side. Therefore, the grounding system of the back stage of the solid-state circuit breaker is changed from TN system to IT (isolation terra) system, which leads to the personal safety of the DC system being reduced.

Figure 2:
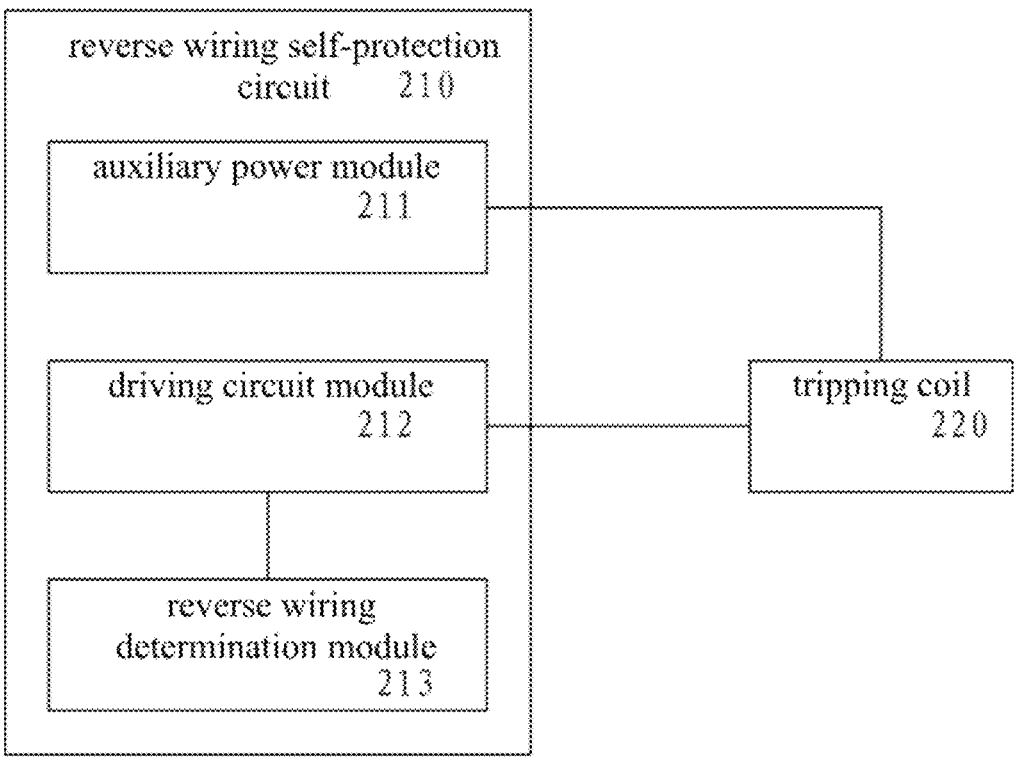
FIG. 2 is a reverse wiring self-protection circuit diagram of a solid-state circuit breaker for DC power according to an embodiment of the present disclosure.

FIG. 2 is a reverse wiring self-protection circuit diagram of a solid-state circuit breaker for DC power according to an embodiment of the present disclosure.

As shown in FIG. 2, the reverse wiring self-protection circuit 210 may include an auxiliary power module 211, a driving circuit module 212 and a reverse wiring determination module 213.

The auxiliary power module 211 may be connected to the tripping coil 220 of the solid-state circuit breaker. The auxiliary power module 211 may be configured to provide tripping electric energy for tripping the solid-state circuit breaker to the tripping coil of the solid-state circuit breaker before the isolating switch of the solid-state circuit breaker is closed.

The reverse wiring determination module 213 may be connected to the driving circuit module 212. The reverse wiring determination module 213 may be configured to determine whether the DC power connected to the solid-state circuit breaker is reverse wired. In response to reverse wiring of the DC power, the reverse wiring determination module 213 may output a first driving enable signal enabling the driving circuit module. The reverse wiring determination module 213 can determine whether the DC power of the solid-state circuit breaker is reverse wired continuously, every predetermined time period or in response to a user's instruction.

The driving circuit module 212 may be connected to the tripping coil 220. The driving circuit module 212 may be configured to transmit a driving signal indicating a tripping operation to the tripping coil 220 in response to the first driving enable signal.

When the reverse wiring situation is detected, the auxiliary power module 211 has prepared tripping electric energy for tripping the solid-state circuit breaker, so the reverse wiring self-protection circuit 210 can quickly trip the solid-state circuit breaker. Such tripping operation indicates that the DC power connected to the solid-state circuit breaker is reversely connected. So as to protect the elements included in the solid-state circuit breaker itself and improve the personal safety of the DC system to which the solid-state circuit breaker is connected.

Figure 3A:
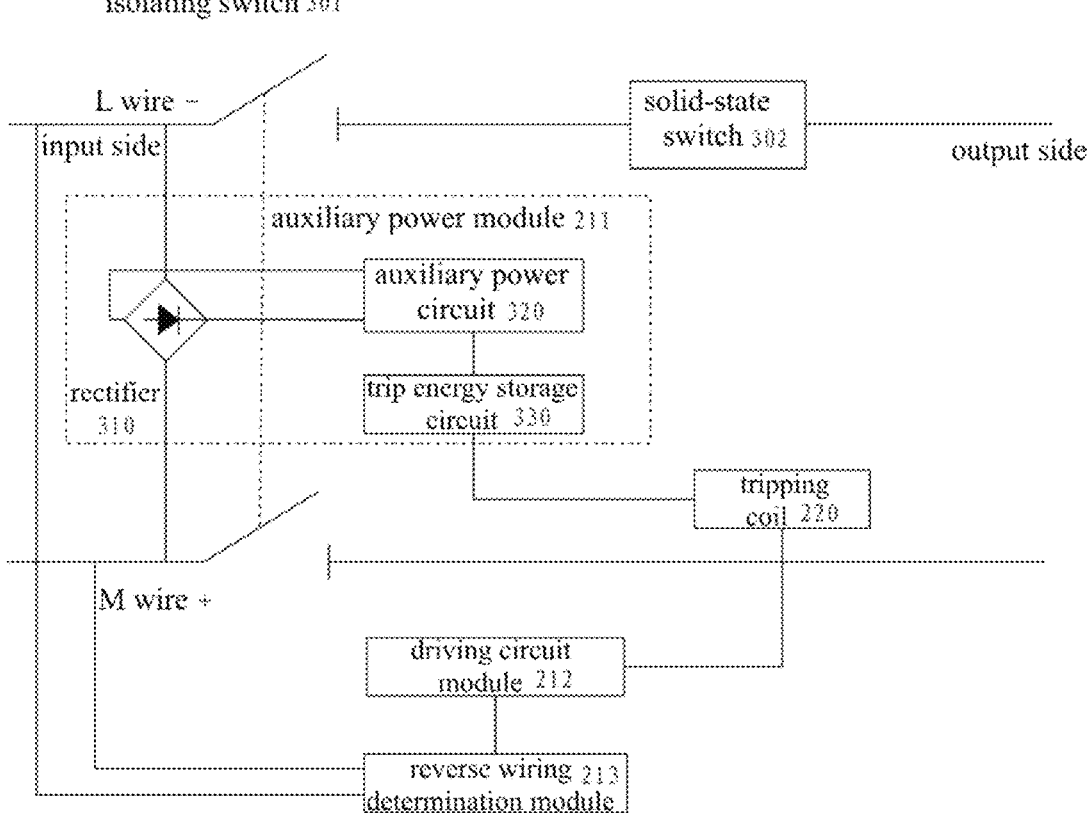
FIGS. 3A-3C are another reverse wiring self-protection circuit diagram according to an embodiment of the present disclosure.

FIG. 3A is another reverse wiring self-protection circuit diagram according to an embodiment of the present disclosure. Description of elements in FIG. 3A that are the same as those in FIG. 2 are not repeated.

As shown in FIG. 3A, the reverse polarity protection circuit may include an auxiliary power module 211, a driving circuit module 212 and a reverse wiring determination module 213.

The auxiliary power module 211 may include a rectifier 310, an auxiliary power circuit 320 and a trip energy storage circuit 330.

The input side of the rectifier 310 may be connected to the L wire and the M wire, and the output side of the rectifier 310 may be connected to the input side of the auxiliary power circuit 320. The rectifier 310 may be configured to rectify the input DC power and provide the rectified voltage to the auxiliary power circuit 320. By rectifying the DC power, it can be ensured that a desired voltage can be provided to the auxiliary power circuit 320 in both the normal wiring and the reverse wiring of the DC power. The rectifier 310 may include a rectifier bridge, but the present disclosure is not limited thereto.

The input side of the auxiliary power circuit 320 may be connected to the output side of the rectifier 310, and the output side of the auxiliary power circuit 320 may be connected to the input side of the trip energy storage circuit 330. The auxiliary power circuit 320 may be configured to generate tripping electric energy based on the rectified voltage and provide the tripping electric energy to the trip energy storage circuit 330. The auxiliary power circuit 320 may include a switching power supply circuit such as a flyback converter, but the present disclosure is not limited thereto.

The input side of the trip energy storage circuit 330 is connected to the output side of the auxiliary power circuit 320, and the output side of the trip energy storage circuit 330 is connected to the tripping coil 220. The trip energy storage circuit 330 may be configured to store the tripping electric energy provided by the auxiliary power circuit 320 to provide energy for completing the tripping operation. The energy to complete the tripping operation can be instantaneous large energy. The trip energy storage circuit 330 may include various energy storage elements such as capacitors.

Figure 3B:
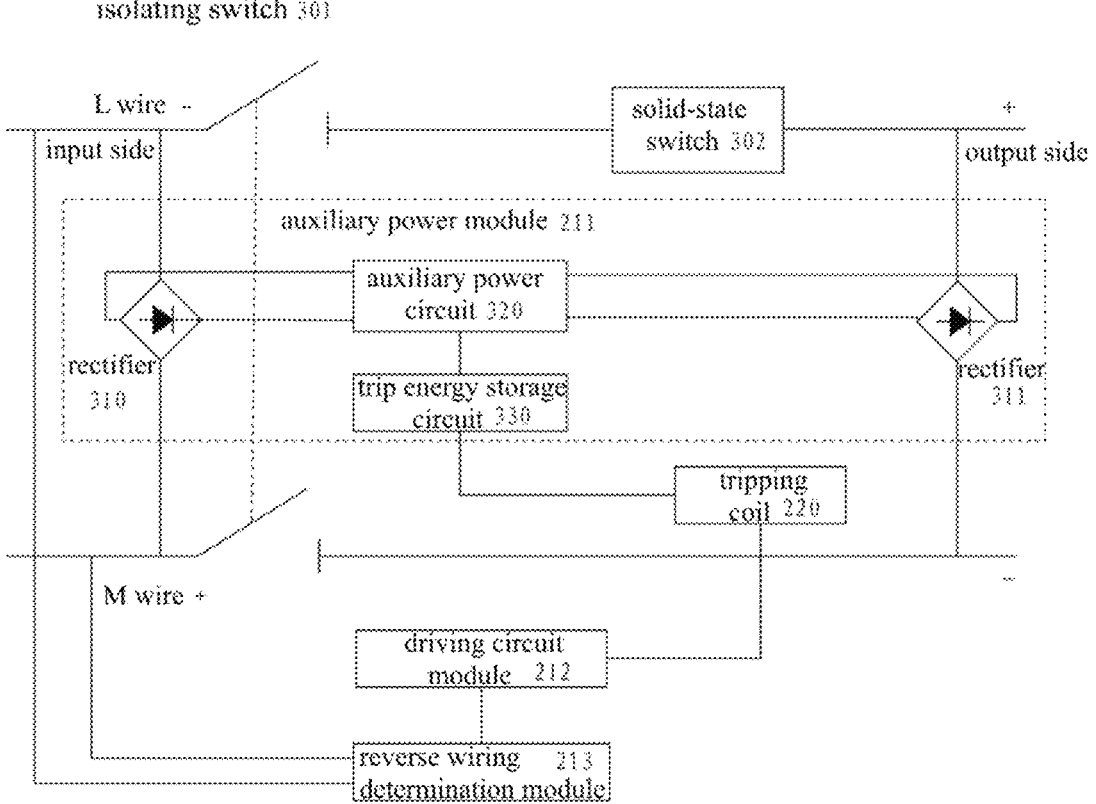

FIG. 3B is another reverse wiring self-protection circuit diagram according to an embodiment of the present disclosure. Description of elements in FIG. 3B that are the same as those in FIG. 3A are not repeated.

The auxiliary power module 211 may include a rectifier 311, a rectifier 312, an auxiliary power circuit 320 and a trip energy storage circuit 330.

As shown in FIG. 3B, the DC power of the solid-state circuit breaker may include a first DC power connected to the input side of the solid-state circuit breaker and a second DC power connected to the output side of the solid-state circuit breaker. That is to say, both the input side and the output side of the solid-state circuit breaker are connected to the DC power supply. The rectifier 310 may be configured to rectify the first DC power connected to the input side of the solid-state circuit breaker and provide it to the auxiliary power circuit 320. The rectifier 311 may be configured to rectify the power of the second DC power connected to the output side of the solid-state circuit breaker and provide it to the auxiliary power circuit 320. The auxiliary power circuit 320 may include an isolated auxiliary power circuit and a non-isolated auxiliary power circuit.

Figure 3C:
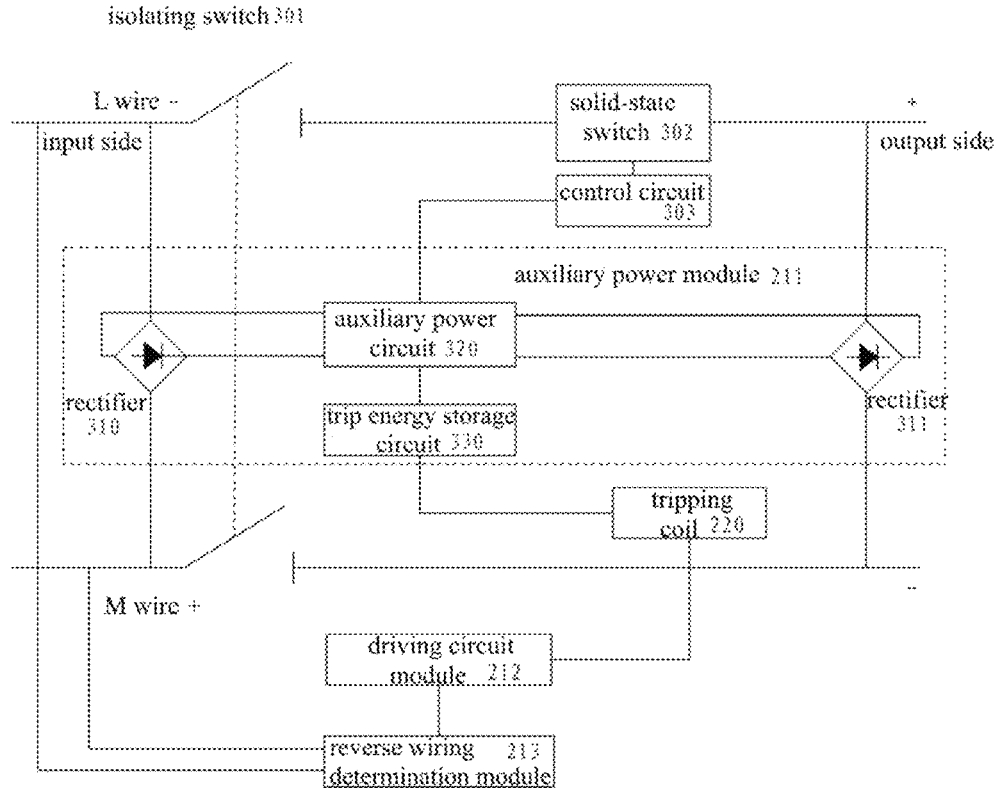

FIG. 3C is another reverse wiring self-protection circuit diagram according to an embodiment of the present disclosure. Description of elements in FIG. 3C that are the same as those in FIG. 3B are not repeated.

As shown in FIG. 3C, the output side of the auxiliary power circuit 320 may be connected to the input side of the control circuit 303. The output side of the control circuit 303 may be connected to the solid-state switch 302 to provide the solid-state switch 302 with control signals about turning on and turning off. The auxiliary power circuit 320 can provide an operating voltage to the control circuit 303 of the solid-state switch 302. The auxiliary power circuit 320 may include an isolated auxiliary power circuit and a non-isolated auxiliary power circuit. Although an auxiliary power module that can obtain power from the input side and the output side of the solid-state circuit breaker is shown in FIG. 3C, it should be understood by those skilled in the art that if the auxiliary power circuit 320 is implemented in the form of an auxiliary power module that only obtains power from the input side in FIG. 3A, it can also be used to provide operating voltage to the control circuit 303 of the solid-state switch 302.

Figure 4A:
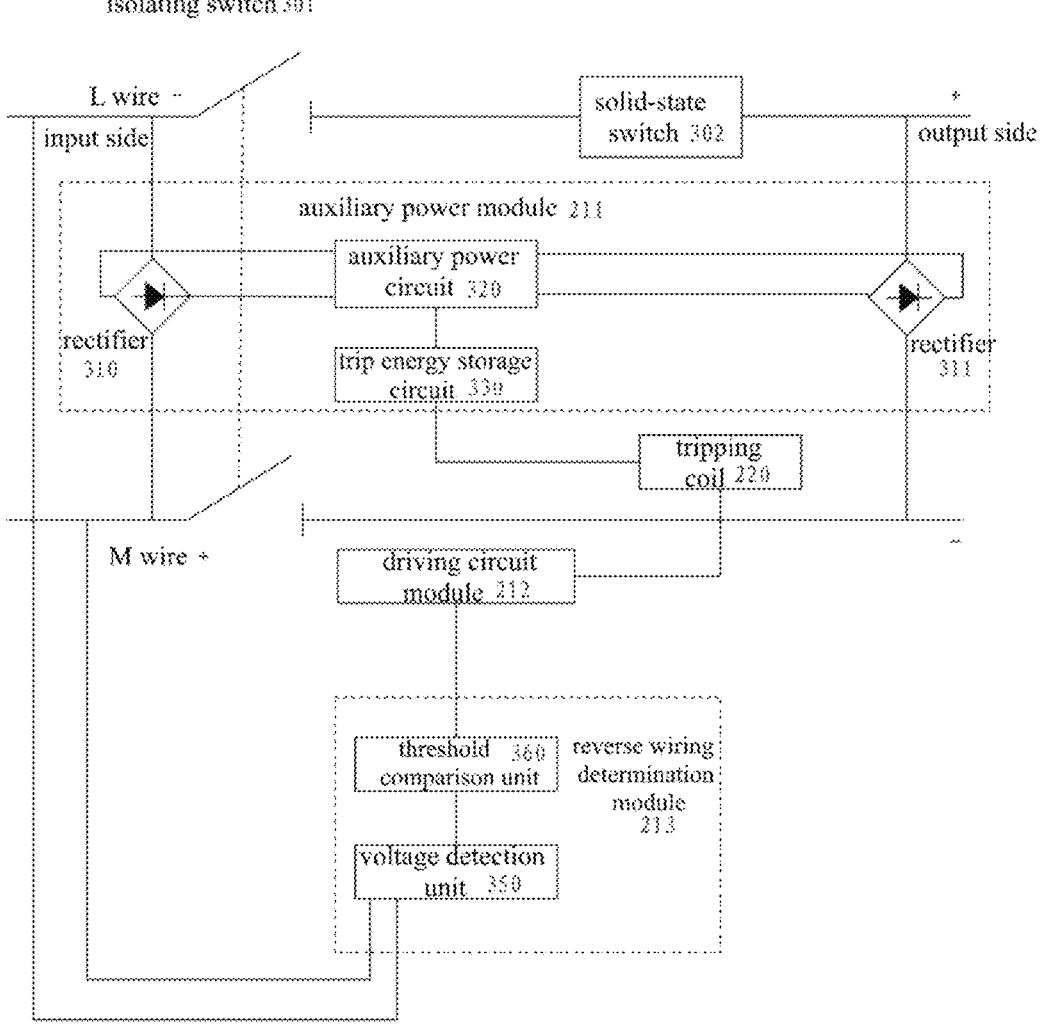

FIG. 4A is another reverse wiring self-protection circuit diagram according to an embodiment of the present disclosure. Description of elements in FIG. 4A that are the same as those in FIGS. 3A-3B will not be described again. Those skilled in the art should understand that the auxiliary power modules in FIGS. 3A-3C can all be applied to the reverse wiring self-protection circuit in FIG. 4A.

As shown in FIG. 4A, the reverse wiring determination module 213 in FIG. 4A includes a voltage detection unit 350 and a threshold comparison unit 360.

The input side of the voltage detection unit 350 may be connected to the L wire and the M wire, and the output side of the voltage detection unit 350 may be connected to the threshold comparison unit 360. The voltage detection unit 350 may include various voltage sensors, such as a resistive voltage-dividing voltage detection unit or an operational amplifier voltage detection unit. The voltage detection unit 350 may be configured to detect the voltage of DC power, for example, the voltage of DC power at the input side of the solid-state circuit breaker.

The input side of the threshold comparison unit 360 is connected to the output of the voltage detection unit 350, and the output side of the threshold comparison unit 360 is connected to the driving circuit module 212. The threshold comparison unit 360 may be configured to compare the voltage of the DC power detected by the voltage detection unit with a threshold to determine whether the DC power is reversely wired. The threshold comparison unit 360 may output a first driving enable signal enabling the driving circuit module. The threshold comparison unit 360 may include various processors, such as a micro-control unit MCU, but the present disclosure is not limited thereto.

FIG. 4B is another reverse wiring self-protection circuit according to an embodiment of the present disclosure. Description of elements in FIG. 4B that are the same as those in FIG. 4A are not repeated.

As shown in FIG. 4B, the reverse wiring determination module 213 in FIG. 4B includes a voltage detection unit 350, a first threshold comparison unit 361 and a second threshold comparison unit 362. Although the first threshold comparison unit 361 and the second threshold comparison unit 362 are shown to be separate, those skilled in the art can understand that the first threshold comparison unit 361 and the second threshold comparison unit 362 can be integrated.

The input side of the first threshold comparison unit 361 is connected to the output of the voltage detection unit 350, and the output side of the first threshold comparison unit 361 is connected to the driving circuit module 212. The first threshold comparison unit 361 may be configured to determine whether the DC power is reversely connected, that is, to compare the output of the voltage detection unit 350 with a first threshold. In response to determining that the DC power is reversely wired (i.e., greater than the first threshold), the first threshold comparison unit 361 may output a first driving enable signal enabling the driving circuit module 212.

Figure 4C:
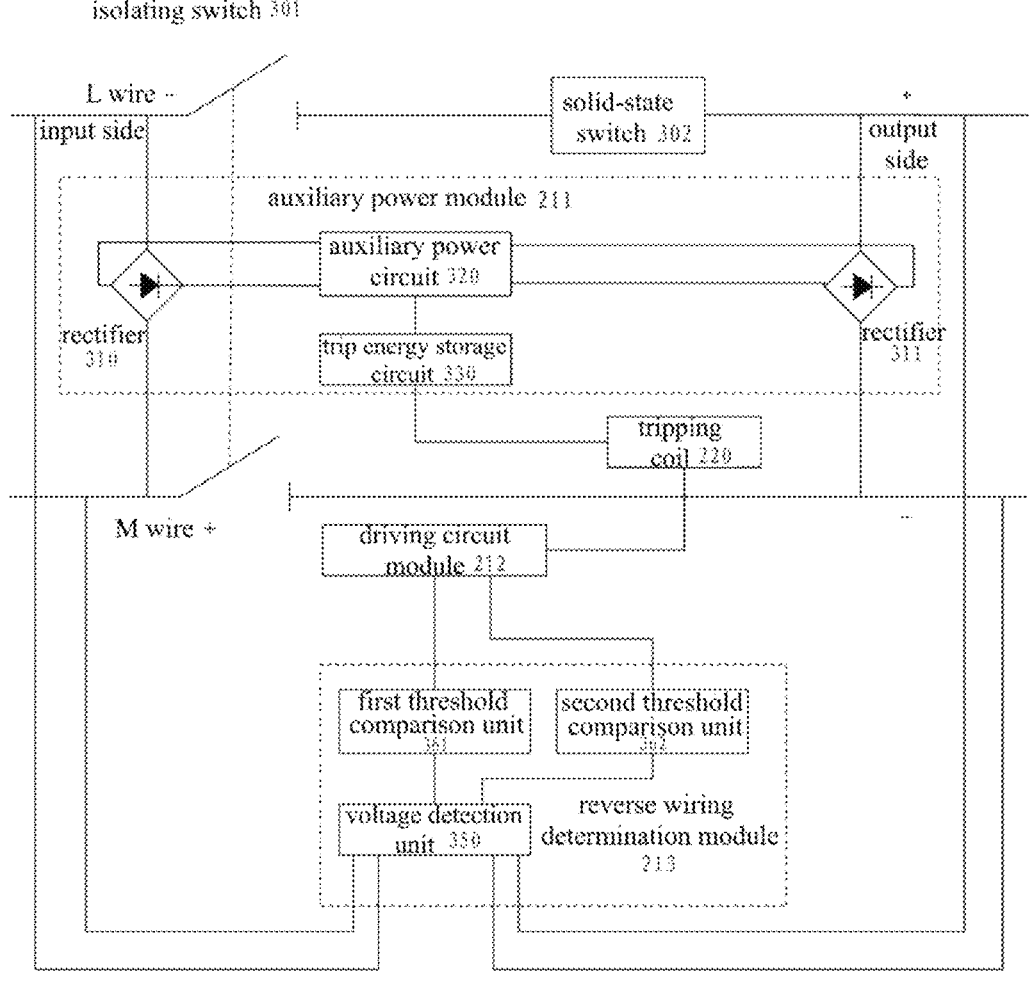

The input side of the second threshold comparison unit 362 is connected to the voltage detection unit 350, and the output side of the second threshold comparison unit 362 is connected to the driving circuit module 212. The second threshold comparison unit 362 may be configured to determine whether over-voltage occurs in the DC power, that is, to compare the output of the voltage detection unit 350 with a second threshold, wherein the first threshold is greater than the second threshold. In response to determining that the DC power is over-voltage (i.e., greater than the second threshold), the second threshold comparison unit 362 may output a first driving enable signal enabling the drive circuit module. That is, the reverse wiring determination module 213 may be configured to output the first driving enable signal enabling the driving circuit module 212 in response to determining that the DC power is reverse wired or overvoltage occurs in the DC power. FIG. 4C is another reverse wiring self-protection circuit according to an embodiment of the present disclosure. Description of elements in FIG. 4C that are the same as those in FIG. 4B are not repeated.

The DC power of the solid-state circuit breaker in FIG. 4C may include a first DC power connected to the input side of the solid-state circuit breaker and a second DC power connected to the output side of the solid-state circuit breaker. That is to say, both the input side and the output side of the solid-state circuit breaker are connected to the DC power supply. The voltage detection unit 350 may be configured to detect the voltage of the first DC power and the voltage of the second DC power of the solid-state circuit breaker, and provide the detected voltages to the first threshold comparison unit 361 and the second threshold comparison unit 362.

Figure 5:
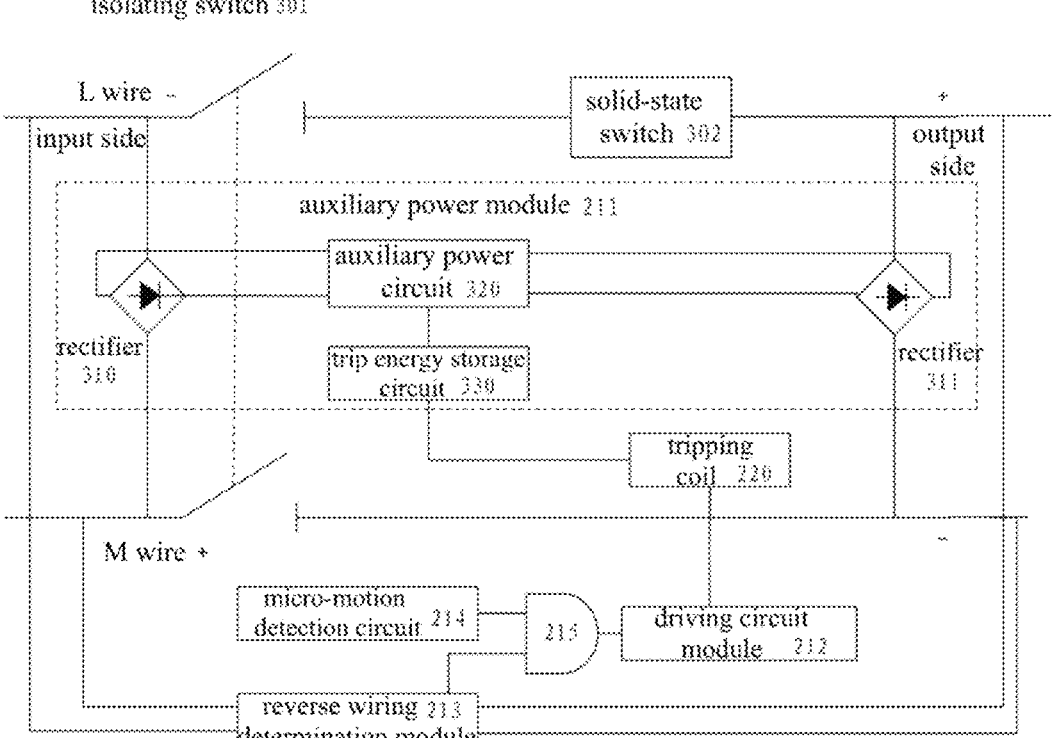
FIG. 5 is another reverse wiring self-protection circuit diagram according to an embodiment of the present disclosure.

FIG. 5 is another reverse wiring self-protection circuit diagram according to an embodiment of the present disclosure. Description of elements in FIG. 5 that are the same as those in FIG. 3B are not repeated.

As shown in FIG. 5, the reverse wiring self-protection circuit also includes a micro-motion detection circuit 214 and an AND logic circuit 215.

The micro-motion detection circuit 214 may be connected to one input end of the AND logic. The micro-motion detection circuit 214 may be configured to detect a micro-motion signal of a handle of the solid-state circuit breaker. In response to detecting the micro-motion signal of the handle of the solid-state circuit breaker, the micro-motion detection circuit 214 may output a second driving enable signal.

Two input ends of the AND logic circuit 215 are respectively connected to the micro-motion detection circuit 214 and the reverse wiring determination module 213, and the output end of the AND logic circuit 215 is connected to the driving circuit module 212. The AND logic circuit 215 may be configured to perform AND operation on the first driving enable signal from the reverse wiring determination module 213 and the second driving enable signal from the micro-motion detection circuit 214 to obtain a third driving enable signal, and transmit the third driving enable signal to the driving circuit module 212. In response to the third driving enable signal, the driving circuit module 212 transmits a drive signal indicating the tripping operation to the tripping coil 220.

Figure 6:
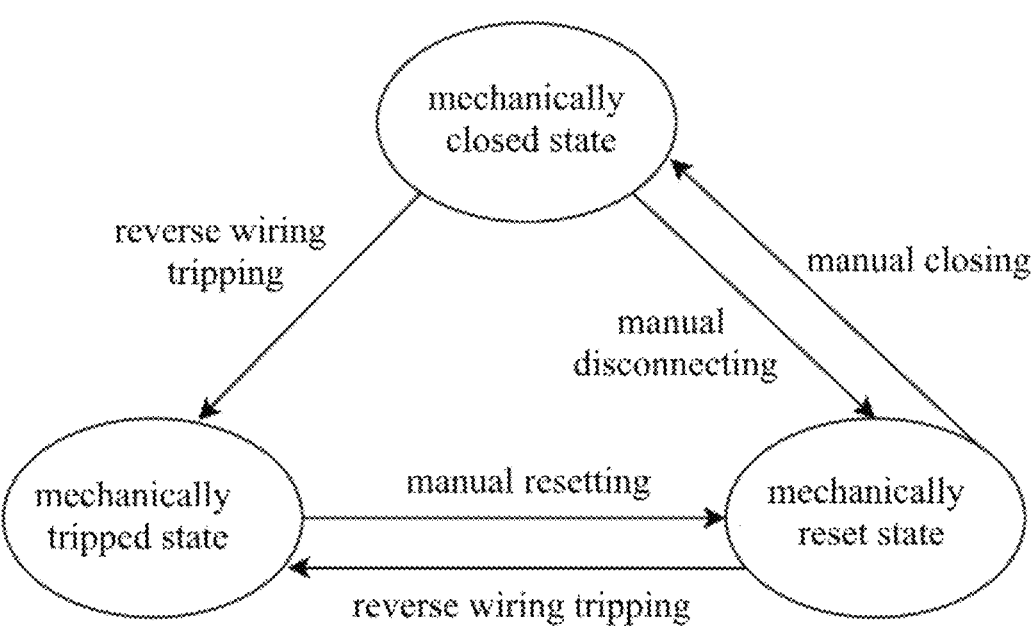
FIG. 6 is a state transition diagram of a solid-state circuit breaker according to an embodiment of the present disclosure.

FIG. 6 is a state transition diagram of a solid-state circuit breaker according to an embodiment of the present disclosure.

Solid-state circuit breaker has mechanically closed state, mechanically reset state and mechanically tripped state.

The user can manually toggle the handle of the solid-state circuit breaker to transition the solid-state circuit breaker from a mechanically reset state to a mechanically closed state (i.e., close the isolating switch of the solid-state circuit breaker) or transition the solid-state circuit breaker from a mechanically closed state to a mechanically reset state (i.e., open the isolating switch of the solid-state circuit breaker). When the reverse wiring self-protection circuit detects that the DC power connected to the solid-state circuit breaker is reverse-wired, if the user transitions the solid-state circuit breaker from a mechanically reset state to a mechanically closed state or from a mechanically tripped state to a mechanically reset state, the tripping coil is driven to perform a tripping operation, so that the solid-state circuit breaker is in a mechanically tripped state.

Figure 7A:
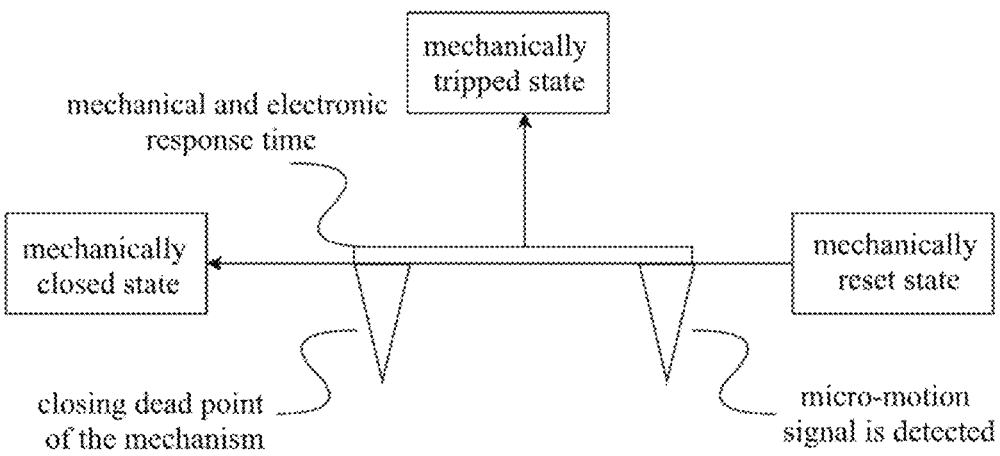
FIG. 7A is a schematic diagram of the solid-state circuit breaker transitioning from a mechanically reset state to a mechanically tripped state.
Figure 8:
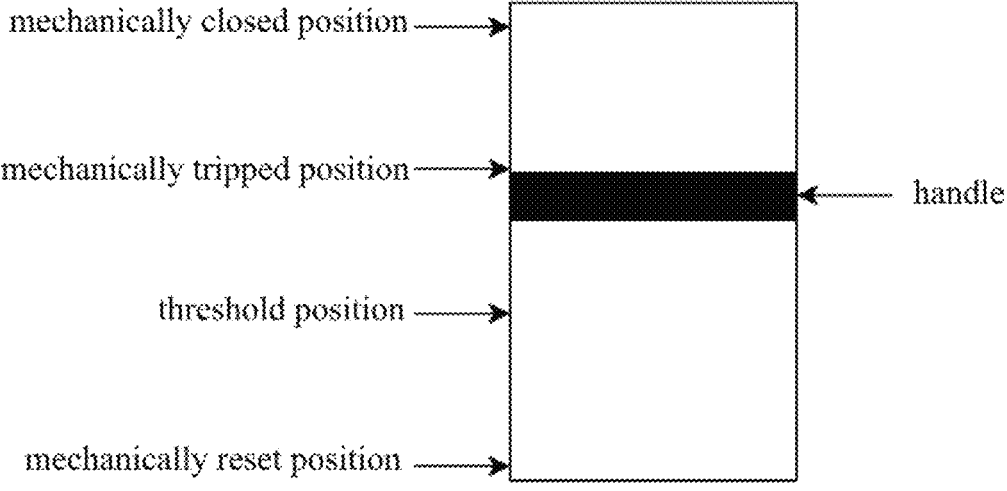
FIG. 8 is a schematic diagram of the stroke of the handle of the solid-state circuit breaker according to the embodiment of the present disclosure.

Now, referring to FIG. 7A, the process of transitioning the solid-state circuit breaker from the mechanically reset state to the mechanically tripped state will be described in detail. FIG. 7A is a schematic diagram of the solid-state circuit breaker changing from a mechanically reset state to a mechanically tripped state. FIG. 8 is a schematic diagram of the stroke of the handle of the solid-state circuit breaker according to the embodiment of the present disclosure.

The solid-state circuit breaker in FIG. 7A is in a mechanically reset state. When the input DC power is reversely wired and the user is ready to close the isolating switch, the DC circuit breaker is transitioned to the mechanically tripped state. The reverse wiring determination module detects the reverse wiring of DC power and outputs a first driving enable signal. When the user toggles the handle to transition the solid-state circuit breaker from the mechanically reset state to the mechanically closed state, the micro-motion detection circuit detects the micro-motion signal. For example, when the handle is between the threshold position of the handle stroke and the mechanically closed position (including the threshold position and the mechanically closed position) of the solid-state circuit breaker, the micro-motion detection circuit detects the micro-motion signal. As shown in FIG. 8, the threshold position can be located between the mechanically tripped position and the mechanically reset position of the solid-state circuit breaker handle. In response to detecting the micro-motion signal, the micro-motion detection circuit outputs a second driving enable signal. The AND logic circuit performs AND operations on the first driving enable signal and the second driving enable signal to obtain a third driving enable signal. In response to the third driving enable signal, the drive circuit module transmits a drive signal to the tripping coil to instruct the tripping operation. Before the isolating switch is closed, the auxiliary power has prepared the tripping electric energy needed for mechanical tripping. Therefore, after detecting the reverse wiring and the micro-motion signal, mechanical and electronic response time elapses, the solid-state circuit breaker can be transitioned to the mechanically tripped state before the handle reaches the closing dead point of the mechanism, that is, the handle of the solid-state circuit breaker is tripped to the mechanically tripped position of the handle stroke. In other words, the solid-state circuit breaker cannot enter the mechanically closed state, so the solid-state circuit breaker realizes the protection function.

Referring back to FIG. 6, when the DC power of the solid-state circuit breaker is not turned on and the user transitions the solid-state circuit breaker from the mechanically reset state to the mechanically closed state, if the DC power with the reverse wiring is turned on, the reverse polarity self-protection circuit drives the tripping coil to perform the tripping operation, so that the solid-state circuit breaker is transitioned to the mechanically tripped state.

Figure 7B:
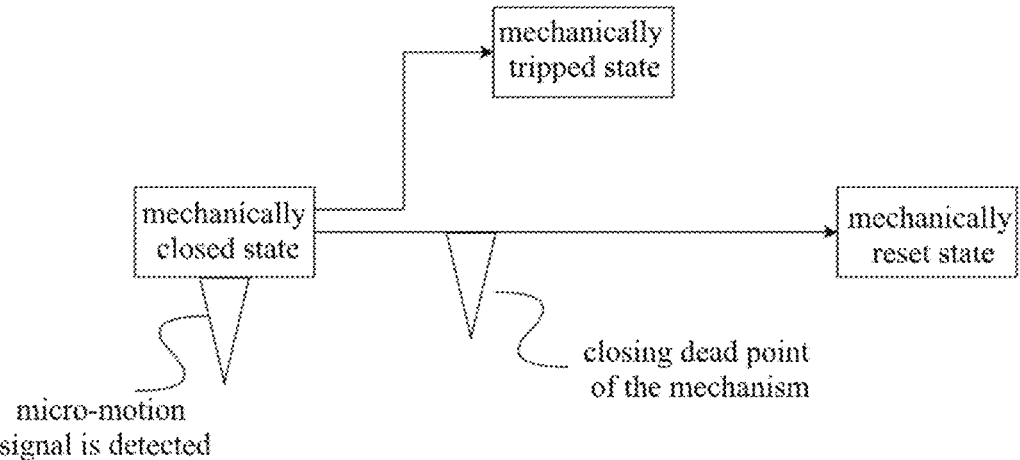
FIG. 7B is a schematic diagram of the solid-state circuit breaker transitioning from a mechanically closed state to a mechanically tripped state.

Now, referring to FIG. 7B, the process of transitioning the solid-state circuit breaker from the mechanically closed state to the mechanically tripped state will be described in detail. FIG. 7B is a schematic diagram of the solid-state circuit breaker transitioning from a mechanically closed state to a mechanically tripped state.

The solid-state circuit breaker in FIG. 7B is in a mechanically closed state when at least one of the two input DC powers is not turned on. When the handle is in the mechanically closed position of the handle stroke, the micro-motion detection circuit can detect the micro-motion signal. In response to detecting the micro-motion signal, the micro-motion detection circuit outputs a second driving enable signal. If the user turns on the DC power with the reverse wiring when the solid-state circuit breaker is in the mechanically closed state, the reverse wiring determination module of the reverse polarity self-protection circuit detects the reverse wiring and outputs the first driving enable signal. The AND logic circuit performs AND operation on the first driving enable signal and the second driving enable signal to obtain a third driving enable signal. In response to the third driving enable signal, the drive circuit module transmits a drive signal to the tripping coil to instruct the tripping operation. Before the isolating switch is closed, the auxiliary power may prepare the tripping electric energy needed for mechanical tripping. Solid-state circuit breakers can quickly transitions to mechanically tripped state, thus realizing the protection function.

Those skilled in the art will appreciate that the various illustrative logical blocks, modules, circuits, and steps described in this disclosure may be implemented as hardware, software, or a combination of both. In order to clearly illustrate this interchangeability between hardware and software, various illustrative components, blocks, modules, circuits, and steps are generally described in the form of their function sets. Whether such a function set is implemented as hardware or software depends on the specific application and the design constraints imposed on the overall system. Skilled people may implement the described functional set in different ways for each specific application, but such design decisions should not be interpreted as causing a departure from the scope of this disclosure.

The various illustrative logical blocks, modules, and circuits described in this disclosure may be implemented or performed with a general processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors cooperating with a DSP core, or any other such configuration.

The steps of a method or algorithm described in this disclosure may be embodied directly in hardware, in a software module executed by a processor, or in a combination of the hardware and the software module. Software modules may reside in RAM memory, flash memory, ROM memory, EPROM memory, EEPROM memory, registers, hard disks, removable disks, or any other form of storage media known in the art. An exemplary storage medium is coupled to a processor to enable the processor to read and write information from/to the storage medium. In the alternative, the storage medium may be integrated into the processor. The processor and storage medium may reside in an ASIC. The ASIC may reside in the user terminal. In the alternative, the processor and the storage medium may reside as separate components in the user terminal.

In one or more exemplary designs, the described functions may be implemented in hardware, software, firmware, or any combination thereof. If implemented in software, each function can be stored on or transmitted by a computer-readable medium as one or more instructions or codes. Computer-readable media include both computer storage media and communication media, and the latter includes any media that facilitates the transfer of computer programs from one place to another. The storage medium can be any available medium that can be accessed by a general-purpose or special-purpose computer.

The above-mentioned embodiments of the present disclosure are only for easy description and help to fully understand the disclosure, and are not intended to limit the scope of the disclosure. Therefore, it should be understood that all modifications and changes or forms of modifications and changes derived from the technical concept of this disclosure fall within the scope of this disclosure, in addition to the above-mentioned embodiments disclosed herein.

The invention claimed is:

1. A reverse wiring self-protection circuit for a solid-state circuit breaker for direct current (DC) power, the solid-state circuit breaker including an isolating switch and a solid-state switch, the reverse wiring self-protection circuit comprising:

an auxiliary power module configured to provide tripping electric energy to a tripping coil before the isolating switch of the solid-state circuit breaker is closed, wherein the isolating switch is connected between the DC power and the solid-state switch; and a reverse wiring determination module configured to determine whether the DC power connected to the solid-state circuit breaker is reversely wired DC power, and in response to the reversely wired DC power, to output a first driving enable signal that enables a driving circuit module, wherein the driving circuit module is configured to transmit a driving signal to the tripping coil in response to the first driving enable signal to thereby isolate, via a tripping operation of the isolating switch, a connection between the solid-state switch and the DC power.

2. The reverse wiring self-protection circuit according to claim 1, wherein the auxiliary power module comprises:

a rectifier configured to rectify the DC power and provide a rectified voltage to an auxiliary power circuit; and an auxiliary power circuit configured to generate tripping electric energy based on the rectified voltage and provide the tripping electric energy to a trip energy storage circuit, wherein the trip energy storage circuit is configured to store the tripping electric energy provided by the auxiliary power module to provide energy for completing the tripping operation.

3. The reverse wiring self-protection circuit according to claim 2, wherein the DC power connected to the solid-state circuit breaker includes a first DC power connected to the input side of the solid-state circuit breaker and a second DC power connected to the output side of the solid-state circuit breaker, wherein, the rectifier is configured to rectify the first DC power and the second DC power and provide rectified first DC power and rectified second DC power, respectively, to the auxiliary power module.

4. The reverse wiring self-protection circuit according to claim 3, wherein the auxiliary power module includes an isolated auxiliary power circuit.

5. The reverse wiring self-protection circuit according to claim 3, wherein the auxiliary power module includes a non-isolated auxiliary power circuit.

6. The reverse wiring self-protection circuit according to claim 3, wherein the auxiliary power module is further configured to provide an operating voltage to a control circuit of the solid-state switch of the solid-state circuit breaker.

7. The reverse wiring self-protection circuit according to claim 1, wherein the reverse wiring determination module comprises:

a voltage detection unit configured to detect a voltage of the DC power; and a threshold comparison unit configured to compare the voltage detected by the voltage detection unit with a threshold to determine whether the DC power is the reversely wired DC power.

8. The reverse wiring self-protection circuit according to claim 7, wherein the threshold comparison unit comprises:

a first threshold comparison unit configured to determine whether the DC power is the reversely wired DC power; and a second threshold comparison unit configured to determine whether overvoltage occurs in the DC power, wherein the reverse wiring determination module is further configured to output the first driving enable signal that enables the driving circuit module in response to determining that the DC power is the reversely wired DC power or an overvoltage occurs.

9. The reverse wiring self-protection circuit according to claim 1, wherein the DC power connected to the solid-state circuit breaker comprises a first DC power connected to an input side of the solid-state circuit breaker and a second DC power connected to an output side of the solid-state circuit breaker, wherein the reverse wiring determination module is configured to determine whether at least one of the first DC power and the second DC power is reversely wired.

10. The reverse wiring self-protection circuit according to claim 1, wherein the solid-state circuit breaker includes a handle, further comprising:

a micro-motion detection circuit configured to:

detect a micro-motion signal of the handle of the solid-state circuit breaker;

output a second driving enable signal in response to detecting the micro-motion signal of the handle of the solid-state circuit breaker; and AND logic circuit configured to:

perform an AND operation on the first driving enable signal and the second driving enable signal to obtain a third driving enable signal; and transmit the third driving enable signal to the driving circuit module, wherein the driving circuit module is configured to transmit the driving signal indicating the tripping operation to the tripping coil in response to the third driving enable signal.

11. The reverse wiring self-protection circuit according to claim 10, wherein the micro-motion detection circuit is configured to detect when the handle of the solid-state circuit breaker is between a threshold position and a mechanically closed position of a handle stroke of the solid-state circuit breaker; and wherein the threshold position is located between a mechanically tripped position and a mechanically reset position of the handle of the solid-state circuit breaker.

12. The reverse wiring self-protection circuit according to claim 10, wherein the micro-motion detection circuit is configured to detect the micro-motion signal when the handle is at the mechanically closed position of the handle stroke.

13. The reverse wiring self-protection circuit according to claim 1, wherein the driving signal indicates the tripping coil to trip the isolating switch in response to the mechanically tripped position of the handle stroke.

14. A solid-state circuit breaker for direct current (DC) power, comprising:

a solid-state switch connected on a live wire of the solid-state circuit breaker;

an isolating switch connected between the solid-state switch and the DC power, and configured to isolate or close a connection between the solid-state circuit breaker and the DC power;

a tripping coil configured, in response to receiving a driving signal, to trip the isolating switch using tripping electric energy provided by an auxiliary power module; and a reverse wiring self-protection circuit comprising:

the auxiliary power module, wherein the auxiliary power module is configured to provide the tripping electric energy to the tripping coil of the solid-state circuit breaker before the isolating switch of the solid-state circuit breaker is closed;

a reverse wiring determination module configured to determine whether the DC power connected to the solid-state circuit breaker is reversely wired, and to output a first driving enable signal enabling a driving circuit module in response to the DC power being reversely wired, wherein the driving circuit module is configured to transmit a driving signal indicating tripping operation to the tripping coil in response to the first driving enable signal to thereby isolate the connection between the solid-state circuit breaker and the DC power.

15. The reverse wiring self-protection circuit according to claim 2, wherein the rectifier includes a rectifier bridge.

16. The reverse wiring self-protection circuit according to claim 1, wherein the auxiliary power module includes a switching power supply circuit.

17. The reverse wiring self-protection circuit according to claim 16, wherein the switching power supply circuit includes a flyback converter.

18. The reverse wiring self-protection circuit according to claim 7, wherein the voltage detection unit includes a voltage sensor.

19. The reverse wiring self-protection circuit according to claim 18, wherein the voltage sensor includes a resistive voltage-dividing detection unit or an operational amplifier voltage detection unit.

20. A circuit comprising:

a solid-state switch connected on a live wire of a solid-state circuit breaker;

an isolating switch of the solid-state circuit breaker, wherein the isolating switch is connected between the solid-state switch and direct current (DC) power;

a tripping coil configured, in response to a driving signal, to open the isolating switch using tripping electric energy to thereby isolate a connection between the solid-state circuit breaker and the DC power; and a reverse wiring self-protection circuit comprising:

an auxiliary power module configured to provide the tripping electric energy before the isolating switch is closed, wherein the auxiliary power module includes a trip energy storage unit, an auxiliary power circuit, and a rectifier configured to rectify the DC power as a rectified voltage, and to provide the rectified voltage to the auxiliary power circuit, wherein the auxiliary power circuit is configured to generate the tripping electric energy based on the rectified voltage and provide the tripping electric energy to the trip energy storage circuit; and a reverse wiring determination module configured to determine whether the DC power is reversely wired, and to output a first driving enable signal enabling a driving circuit module in response to the DC power being reversely wired, wherein the reverse wiring determination module comprises:

a voltage detection unit configured to detect a voltage of the DC power;

a threshold comparison unit configured to compare the voltage of the DC power with a threshold to thereby determine whether the DC power is reversely wired; and a driving circuit module configured to transmit a driving signal indicating a tripping operation to the tripping coil in response to the first driving enable signal, thereby isolating the connection between the solid-state circuit breaker and the DC power.

* * * * *